(12) United States Patent
Sahu et al.

(10) Patent No.: US 12,205,389 B2
(45) Date of Patent: Jan. 21, 2025

(54) METHOD AND SYSTEM FOR HANDWRITTEN INPUT RECOGNITION

(71) Applicant: SAMSUNG ELECTRONICS CO., LTD., Suwon-si (KR)

(72) Inventors: Pragya Paramita Sahu, Telangana (IN); Paritosh Mittal, Rajasthan (IN); Himanshu Pandotra, Jammu and Kashmir (IN); Vikrant Singh, Rajasthan (IN); Kunal Aggarwal, Delhi (IN); Viswanath Veera, Bangalore (IN); Shankar M Venkatesan, Bangalore (IN); Afzal Shama Soudagar, Andhra Pradesh (IN); Vishal Vatsalya, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 17/715,592

(22) Filed: Apr. 7, 2022

(65) Prior Publication Data

US 2022/0270385 A1 Aug. 25, 2022

Related U.S. Application Data

(63) Continuation of application No. PCT/KR2022/002720, filed on Feb. 24, 2022.

(30) Foreign Application Priority Data

Feb. 25, 2021 (IN) .............................. 202141008001

(51) Int. Cl.
*G06V 30/22* (2022.01)
*G06F 40/279* (2020.01)
*G06V 10/82* (2022.01)

(52) U.S. Cl.
CPC ............ *G06V 30/22* (2022.01); *G06F 40/279* (2020.01); *G06V 10/82* (2022.01)

(58) Field of Classification Search
CPC ....... G06V 30/22; G06V 10/82; G06F 40/279
See application file for complete search history.

(56) References Cited

U.S. PATENT DOCUMENTS 9,201,592 B2 12/2015 Akhavan Fomani et al.
9,286,895 B2 3/2016 Jung et al.
(Continued)

FOREIGN PATENT DOCUMENTS

KR 10-2020-0069058 6/2020

OTHER PUBLICATIONS

Indian Office Action issued Sep. 9, 2022 in corresponding IN Patent Application No. 202141008001.
(Continued)

*Primary Examiner* — Diane D Mizrahi
(74) *Attorney, Agent, or Firm* — Nixon & Vanderhye, P.C.

(57) ABSTRACT

The disclosure relates to a handwritten input-recognition method for an electronic-device. The method comprises: obtaining by the device, at least one first handwriting input representative of at least one object. A context of the at least one first handwriting input is determined based on referring a log of actions performed upon the device. Using a neural network, a positional significance of the at least one first handwriting input is analyzed in relation to the determined context. A description depicting location of the at least one object is generated based on the analyzed positional significance of the at least one first handwriting-input. A command in response to the generated scene description is generated to enable performance of an action, the command referring the location of the at least one object within the scene.

18 Claims, 23 Drawing Sheets

(56) References Cited

U.S. PATENT DOCUMENTS

| | | |
|---|---|---|
| 9,639,767 B2 | 5/2017 | Perrin et al. |
| 10,346,476 B2 | 7/2019 | Bequet |
| 2018/0204111 A1* | 7/2018 | Zadeh ................ G06V 10/764 |
| 2019/0370617 A1 | 12/2019 | Singh et al. |

OTHER PUBLICATIONS

Search Report and Written Opinion dated May 31, 2022 issued in International Patent Application No. PCT/KR2022/002720.
Barvadevabhatla, Ravi Kiran et al., "SketchParse : Towards Rich Descriptions for Poorly Drawn Sketches using Multi-Task Hierarchical Deep Networks," arXiv:1709.01295v1, pp. 1-20, Sep. 2017 [retrieved on May 16, 2022], pp. 1, 13; and figure 6.
Ahmad, Jamil et ali., "Data augmentation-assisted deep learning of handdrawn partially colored sketches for visual search," Plos One, vol. 12, Issue 8, pp. 1-19, Aug. 31, 2017 [retrieved on May 16, 2022], pp. 1-17.
Wan, Hai et al., "Representation learning for scene graph completion via jointly structural and visual embedding," Proceedings of the 27th International Joint Conference on Artificial Intelligence (IJCAI-18), pp. 949-956, Jul. 13, 2018 [retrieved on May 16, 2022], pp. 949-955; and figures 1-3.
Zhang, Jianhui et al., "Context-based sketch classification," Expressive 18: Proceedings of the Joint Symposium on Computational Aesthetics and Sketch-Based Interfaces and Modeling and Non-Photorealistic Animation and Rendering, Article No. 3, pp. 1-10, 17-19, Aug. 2018 [retrieved on May 16, 2022], pp. 1-8; and figure 4.
Zhang, Xingyuan et al., "A Hybrid convolutional neural network for sketch recognition," Pattern Recognition Letters, vol. 130, pp. 73-82, Feb. 10, 2020 [retrieved on May 16, 2022], pp. 73-81.

* cited by examiner

FIG. 1A
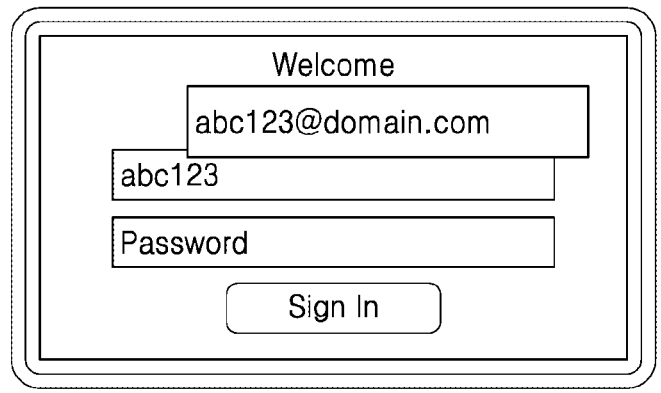

FIG. 1B
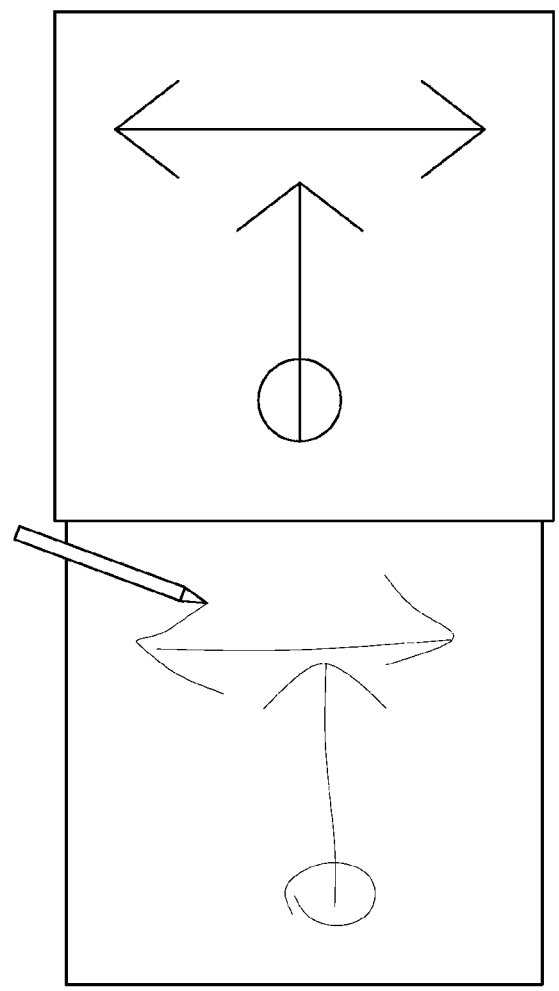
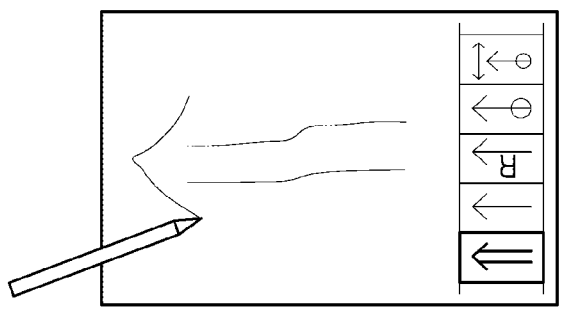

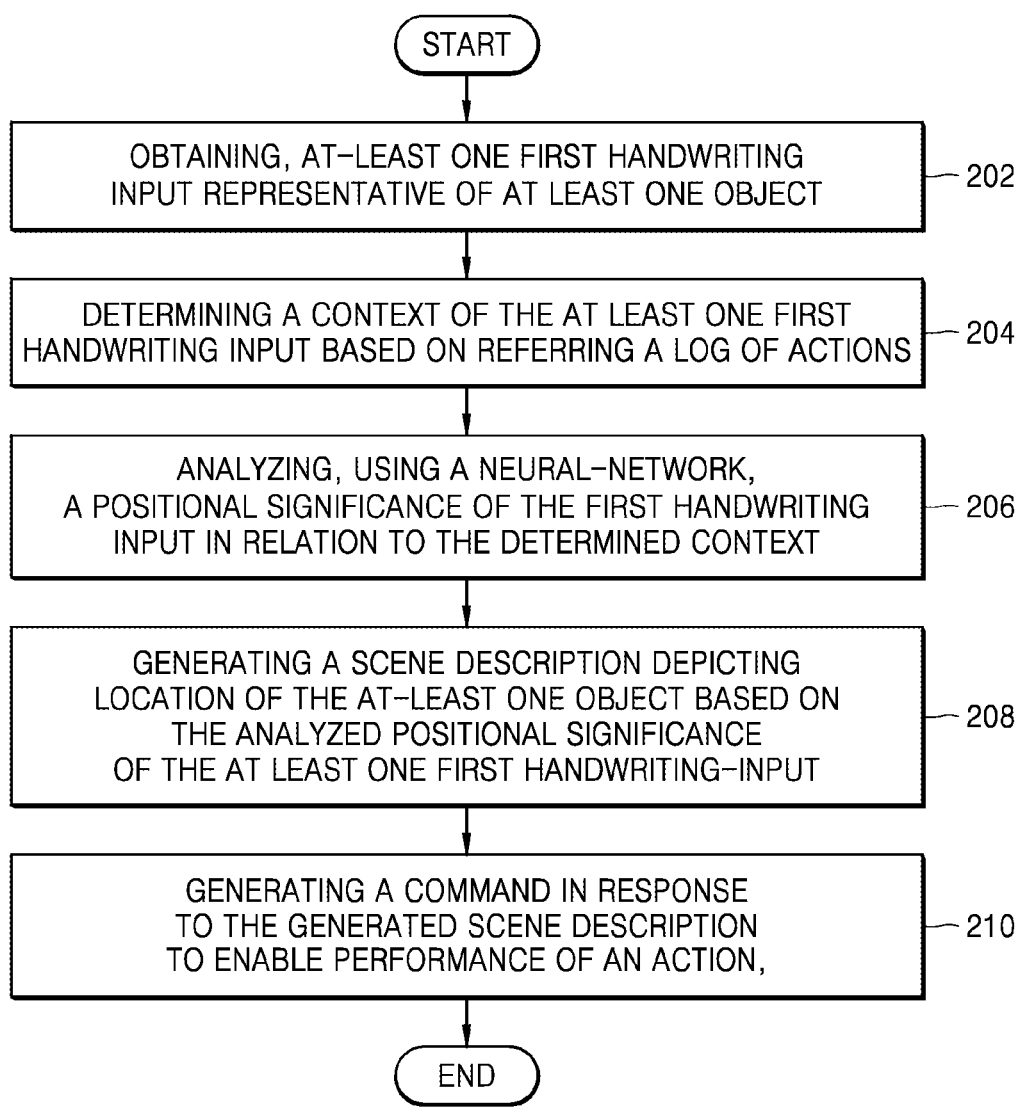

FIG. 14A
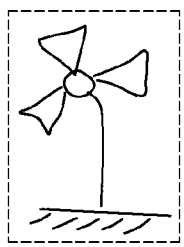 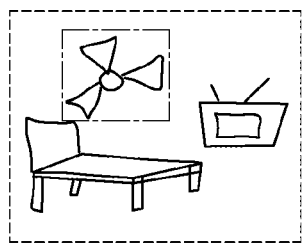 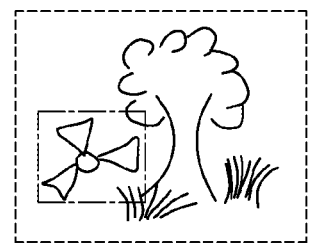
System recognizes as Fan  System recognizes as Flower CS can be used to
highlight motion and improve
scene description.

FIG. 16C
 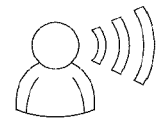
How many calories

METHOD AND SYSTEM FOR HANDWRITTEN INPUT RECOGNITION

CROSS-REFERENCE TO RELATED APPLICATIONS

This application is a continuation of International Application No. PCT/KR2022/002720 designating the United States, filed on Feb. 24, 2022, in the Korean Intellectual Property Receiving Office and claiming priority to Indian Patent Application No. 202141008001, filed on Feb. 25, 2021, in the Indian Patent Office, the disclosures of which are incorporated by reference herein in their entireties.

BACKGROUND

Field

The disclosure relates to image processing techniques, for example, to AI-based image feature detection and processing.

Description of Related Art

Continuous inputs from users (handwriting, doodling, gestures etc.) are often ambiguous and difficult to recognize. The confusion results in failed recognition and user is often asked to refine input. In this context, the forthcoming paragraphs cite state of the art publications.

FIG. 1A illustrates context-aware handwriting recognition for application input fields based publication. The publication aims at correctly aligning and placing the user handwriting on input-space. The font size and type are changed for better visual appeal. An objective is to aesthetically place the user handwriting in input fields for applications like forms, pdfs etc. By context, the publication denotes mean information about the font size, types etc. from adjacent fields. By recognition, the publication suggests only email ids when input type is email.

FIG. 1B illustrates another publication titled "Sketch entry and interpretation of graphical user interface design". The publication aims to recognize arrow like sketches (left swipe, right swipe) as inputs and execute GUI commands mapped to each gesture. Their task is to use gestures to control GUI and by interpretation, they may refer, for example, to identifying and executing the pre-mapped command of GUI design.

FIG. 1C illustrates another publication "Method and apparatus for processing multiple inputs". The same uses a different modality (voice) to change the font size, shape and other properties of previous input. System uses recognized voice input to make aesthetic changes to the previously provided text input. It does not talk about the recognition ability of user inputs. System makes the changes suggested by the user to the text input just provided. It does not enhance system understanding of user needs using latent attributes provided by the complete scene context. It includes editing the previous user inputs and adds a UX feature working on front end.

Overall, state of the art systems do not understand user needs by taking into account the integrated-scene, and rather resort to seeing the individual elements.

There is a need to enhance the stroke recognition and interpretation ability of continuous stroke (handwriting/gesture) input.

There is a need to reduce ambiguities from incomplete user input using additional global context.

SUMMARY

Embodiments of the disclosure provide a handwritten input-recognition method for an electronic-device.

According to various example embodiments of the present disclosure, a method comprises: obtaining at least one first handwriting input representative of at least one object. A context of the first handwriting input is determined based on referring to a log of actions performed upon the device. Using a neural network, a positional significance of the first handwriting input is analyzed in relation to the determined context. A description depicting location of the at least one object is generated based on the analyzed positional significance of the first handwriting-input. A user command in response to the generated scene description is generated to enable performance of an action, said command referring the location of the at least one object within the scene.

According to various example embodiments of the present disclosure, an electronic device comprises: a memory; and a processor, the processor configured to: obtain at least one first handwriting input representative of at least one object; determine a context of the at least one first handwriting input by referring to a log of actions; control a neural-network to analyze to analyze, a positional significance of the at least one first handwriting input in relation to the determined context; generate a scene description depicting location of the at least one object based on the analyzed positional significance of the at least one first handwriting input; and control a natural language understanding (NLU) module to generate a command in response to the generated scene description to enable performance of an action, the command referring the location of the at least one object within the scene.

According to various example embodiments of the present disclosure, a method comprises: receiving, by the device, selection of at least one background; receiving, by the device, at least one first handwriting input representative of at least one object over the selected background; determining a context associated with the background by referring to a log of actions performed upon the device; analyzing, using a neural-network, a positional significance of the first handwriting input in relation to the determined context; generating a scene description depicting location of the at least one object based on the analyzed positional significance of the first handwriting input; and generating a command in response to the generated scene to enable performance of an action, the command encoding the location of the at least one object within the scene.

The method may further comprise: accessing one or more previously recognized objects related to the background, the previously recognized objects corresponding to one or more modalities other than handwriting to render information about global context; recognizing one or more keywords based on the one or more accessed objects; and combining the recognized keywords to determine one or more possible scenarios governing the contexts.

The method may further comprise: recognizing a continuous stroke (CS) input based on: generating an intermediate recognition result based on the at least one first handwriting input and one or more subsequent handwriting inputs; learning a weight of historically captured keywords and one or more possible scenarios associated with the context; and recognizing the CS input from the intermediate recognition result based on the learned weight.

The method may further comprise: forming a multi-dimensional representation based on: arranging recognized keywords and corresponding bounding boxes in a diagrammatic representation at one or more positions, the recognized keywords and positions being determined based on the context and the positional significance of the at least one first handwriting input and the one or more subsequent handwriting inputs; converting the diagrammatic representation into a dense graph; and extracting one or more logical relationships from a dense graph and extracting a list of all extracted features with proper keywords.

The method may further comprise: generating the query based on one or more of: the extracted features; a set of keywords comprising previously stored keywords or current recognized keywords associated with the context and the positional significance of the handwritten input; the environment and the scene description linked with a device controlled by a user; and optionally one or more on-device platforms or remote-server platforms.

The input may comprise the handwriting input is succeeded by another set of one or more single modality or multimodality inputs for facilitating the context determination and the recognition.

The method may further comprise: receiving one or more of the handwriting input and/or multimodality input in a succession; determining the context and positional significance of the handwriting input based on a mutual relation amongst the one or more received handwriting input and/or multimodality input.

According to various example embodiments of the present disclosure, an electronic system including an electronic device configured to recognize handwritten input comprising: a processor configured to: control the device to receive selection of at least one background; control the device to receive at least one first handwriting input representative of at least one object over the selected background; determine a context associated with the background by referring to a log of actions performed upon the device; control a neural-network to analyze a positional significance of the first handwriting input in relation to the determined context; generate a scene description depicting location of the at least one object based on the analyzed positional significance of the first handwriting-input; and control a natural language understanding (NLU) module to generate a command in response to the generated scene to enable performance of an action, the command encoding the location of the at least one object within the scene.

Advantages and features of various example embodiment of the disclosure will be provided with reference to various embodiments, which is illustrated in the appended drawings. It is appreciated that these drawings depict only example embodiments and are therefore not to be considered limiting of its scope. The disclosure will be described and explained with additional specificity and detail with reference to the accompanying drawings in the following detailed description.

BRIEF DESCRIPTION OF THE DRAWINGS

The above and other features, aspects, and advantages of certain embodiments of the present disclosure will be more apparent from the following detailed description, taken in conjunction with the accompanying drawings in which like characters represent like parts throughout the drawings, and in which:

FIGS. 1A, 1B and 1C are diagrams illustrating examples of conventional art publications;

FIG. 2 is a flowchart illustrating an example method of operating an electronic device according to various embodiments;

FIGS. 14A and 14B are diagrams illustrating an example outcome according to various embodiments;

FIGS. 16A, 16B and 16C are diagrams illustrating an example outcome according to various embodiments.

Figure 1C:
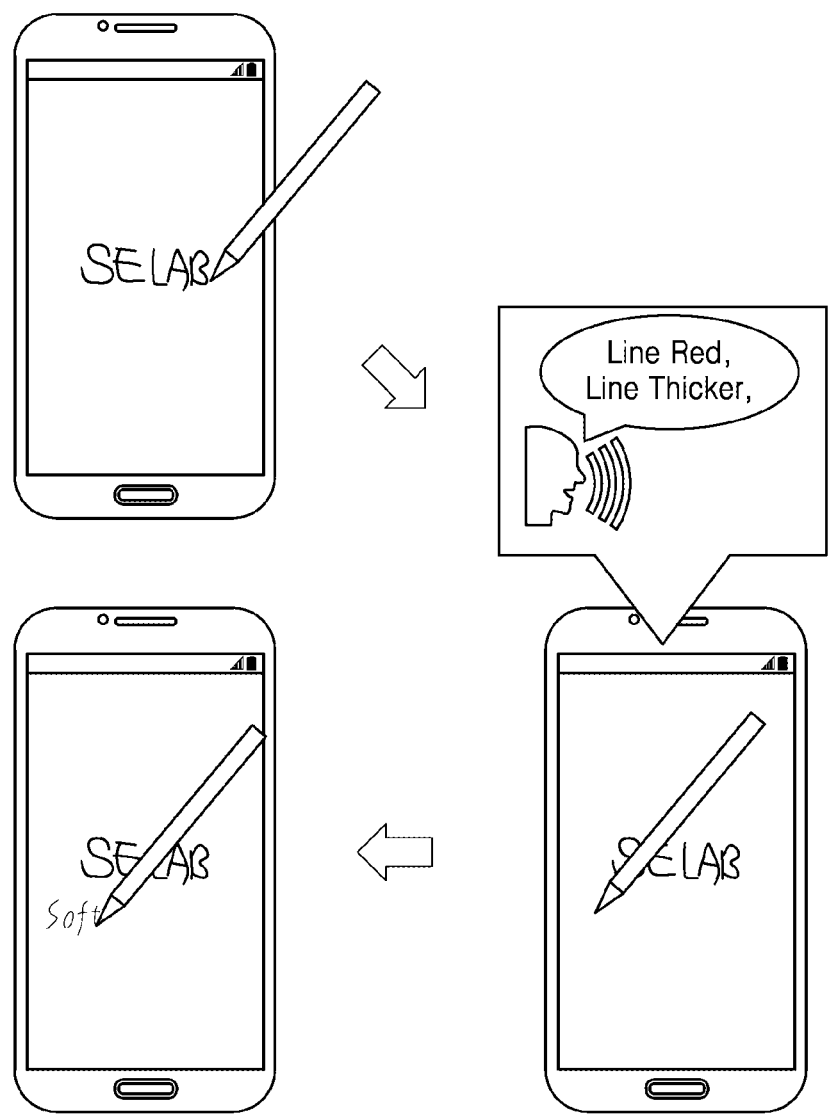

Further, skilled artisans will appreciate that elements in the drawings are illustrated for simplicity and may not have been necessarily been drawn to scale. For example, the flowcharts illustrate example methods in terms of operations involved to help to improve understanding of aspects of the present disclosure. Furthermore, in terms of the construction of the device, one or more components of the device may have been represented in the drawings by conventional symbols, and the drawings may show various details that are pertinent to understanding the various example embodiments so as not to obscure the drawings with details that will be readily apparent to those of ordinary skill in the art.

DETAILED DESCRIPTION

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are merely illustrative of the present disclosure and are not intended to be restrictive thereof.

Reference throughout this disclosure to "an aspect", "another aspect" or similar language may refer, for example, to a particular feature, structure, or characteristic described in connection with an embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

FIG. 2 is a flowchart illustrating an example method according to various embodiments. A handwritten input-recognition method for an electronic-device comprises obtaining (202) by the device, at least one first handwriting input representative of at least one object. The at least one handwriting input may be a hand-scribbled sign comprising one or more strokes, the at least one handwriting input comprising one or more successive inputs. The input may be drawn over a background selected by the user beforehand. Further, the device obtains a second handwriting input represented by continuous stroke input and representative of a second object. The second object may be other than the object associated with the first handwriting input.

Further, the method comprises determining (204) a context of the first handwriting input based on referring a log of actions performed upon the device. The log of actions may include, for example, historically executed user actions prior to the first handwriting input. The determination of the context may include, for example, accessing one or more previously recognized objects related to the background, said previously recognized objects corresponding to one or more modalities other than handwriting to render information about the global context. One or more keywords may be recognized based on the one or more accessed objects. The recognized keywords may be combined to determine one or more possible scenarios governing the contexts.

Further, the method may include analyzing (206), using a neural-network, a positional significance of the first handwriting input in relation to the determined context. The analyzing of the positional significance of the first handwriting input comprises recognizing a continuous stroke (CS) input based on generating an intermediate recognition result based on the at least one first handwriting input and one or more subsequent handwriting inputs. Weights of historically captured keywords may be learned and one or more possible scenarios associated with the context. The CS input is recognized from the intermediate recognition result based on the learned weight. The analysis of the positional significance may further include analyzing a positional relationship of the second handwriting input with reference to the first handwriting input in relation to the determined context.

In an embodiment, the user input including the handwriting input may be succeeded by another set of one or more single modality or multimodality inputs in a succession. In such a scenario, the context and positional significance of the handwriting input is determined based on a mutual-relation amongst the one or more obtained handwriting input and/or multimodality input.

The method may further include generating (208) a scene description depicting location of the at least one object based on the analyzed positional significance of the first handwriting-input. The generating of the scene description comprises forming multi-dimensional representation based on arranging recognized keywords and corresponding bounding boxes in a diagrammatic representation at one or more positions, said recognized keywords and positions determined based on the context and the positional significance of the at least one first handwriting input and the one or more subsequent handwriting inputs. The diagrammatic representation is converted into a dense graph. One or more logical relationships may be extracted from a dense graph and thereby extracting a list of all extracted features with proper keywords.

The method may further include generating (210) a user command in response to the generated scene description to enable performance of an action, the command may refer to the location of the at least one object within the scene. The generation of the user command comprises extracting parameters as one or more of environment, keywords, stroke mappings, features based on the scene description and location of the at least one object within the scene description, the environment and scene description having been optionally linked with a device controlled by the user. The parameters may be combined to generate a search query, said search query corresponding to natural language query or machine-language query.

In another example, the generation of the user command may include generating the query based on one or more of the extracted features, a set of keywords comprising previously stored keywords or current recognized keywords associated with the context and the positional significance of the handwritten input, the environment and the scene description linked with a device controlled by the user; and optionally one or more on-device platforms or remote-server platforms. The platforms may include an imaging application, an imaging database, an imaging device, augmented reality imaging, or the like.

Figure 3:
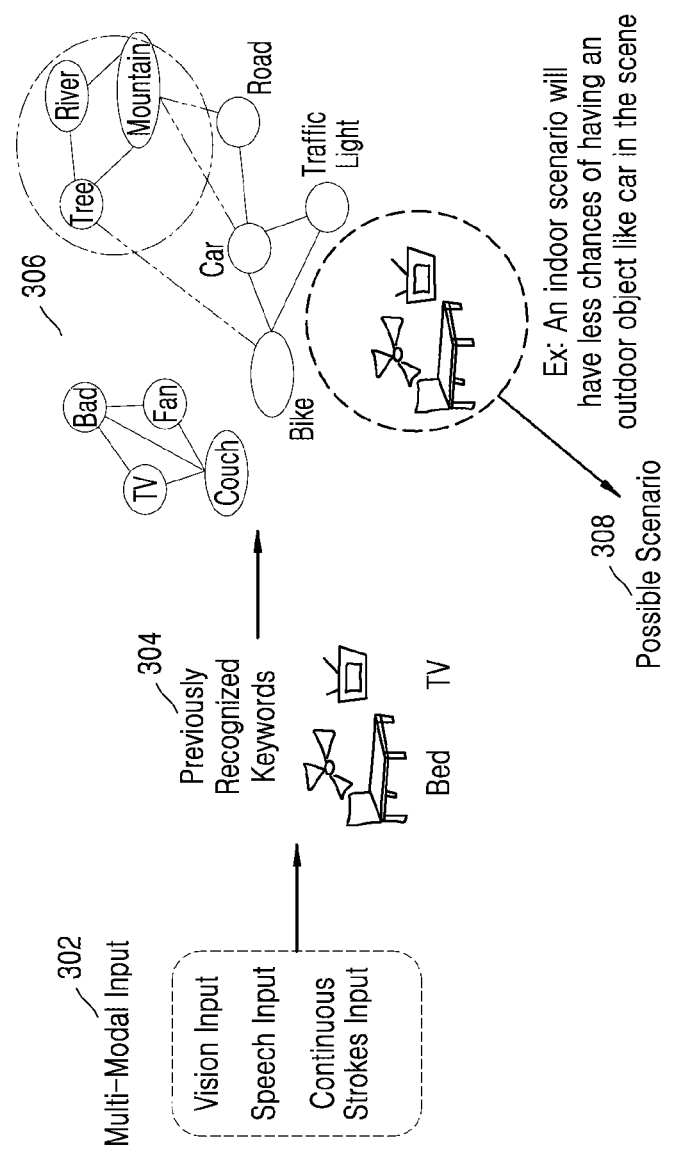
FIG. 3 is a diagram illustrating an example automated scenario classification according to various embodiments.

FIG. 3 is a diagram illustrating an example automated scenario classification and may correspond to operations 202 and 204 of FIG. 2 according to various embodiments. According to an embodiment, previously recognized objects (from multiple modalities) provide critical information about global context or scenarios. The correctly recognized keywords are clustered into possible scenes like indoor, outdoor, natural scene, cityscape etc. Accordingly, those future keywords should seldom deviate from predicted scene.

Operation 302 denotes receipt of multimodal input as Vision Input, speech input and continuous stroke (CS) input corresponding to handwriting input. Examples of vision input include Smart AR Glasses, Camera, IoT cameras etc. An example of speech input may include a microphone.

Examples of CS input include handwriting, doodle, gesture, and swipe. The handwriting input may be hand-scribbled sign comprising one or more strokes, the at least one handwriting input including one or more successive inputs.

Operation 304 denotes extraction of previously recognized keywords. Past or historical user inputs may be iteratively recognized to further refine predictions. Such a log of actions may include historically executed user actions prior to the first handwriting input.

Operation 306 may correspond to a clustering criteria wherein similar to word vector embeddings, an object-scene embedding may be created. One or more keywords may be recognized based on the one or more accessed objects. Object classes may have weighted connections that group them based on the likelihood of appearance. Dynamic Clusters may be created in the embedding space. Objects close to each other (having higher weighted connections) may be classified as possible scenes. The probability that next object belongs to same cluster is much higher and the same relationship is leveraged. For example, an indoor scenario will have less chances of having an outdoor object like car in the scene.

Operation 308 may relate determination of context or scenarios wherein the correctly recognized keywords are clustered or combined into possible scenes like indoor, outdoor, natural scene, cityscape etc, and thereby mitigating possibility that future keywords will highly deviate from predicted scene. Example scenarios include Indoor environment such as House, office, shops, events (Birthdays etc.). Outdoor environments include Parks, City, Natural Scenes and Stadium/Zoo, etc.

Figure 4:
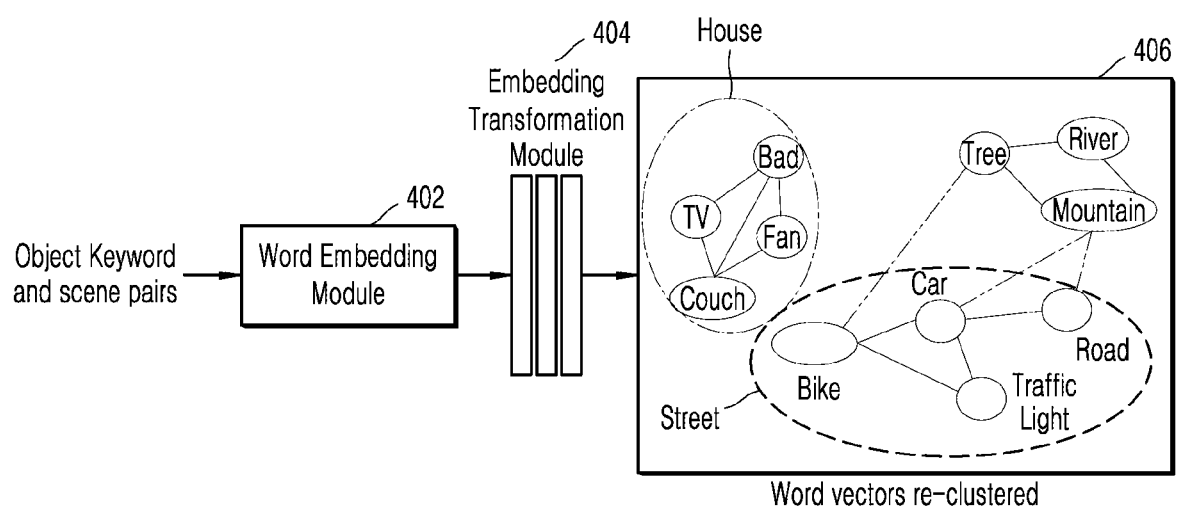
FIG. 4 is a diagram illustrating an example training-phase with respect to automatic-classification scenario of FIG. 3 according to various embodiments.

FIG. 4 is a diagram illustrating an example training phase with respect to automatic-classification scenario of FIG. 3 according to various embodiments. In such a scenario, the training data may include a list of possible scenes to be supported with object keywords that can be contained in the scene, wherein the list is non-exhaustive in nature and may be construed to cover further instances or examples.

Operation 402 may refer, for example, to word embedding, wherein pre-trained embeddings like GLoVE may be used to convert the word into a vector space with similar objects close to each other.

Operation 404 may refer, for example, to embedding training, wherein fully connected layers transform the vectors of objects belonging to the same "scene" into a space "close" to each other Operation 406 may refer, for example, to threshold based clustering, wherein transformed word vectors clustered are together with the tag of the known "scene" information. Accordingly, cluster thresholds are updated.

Figure 5:
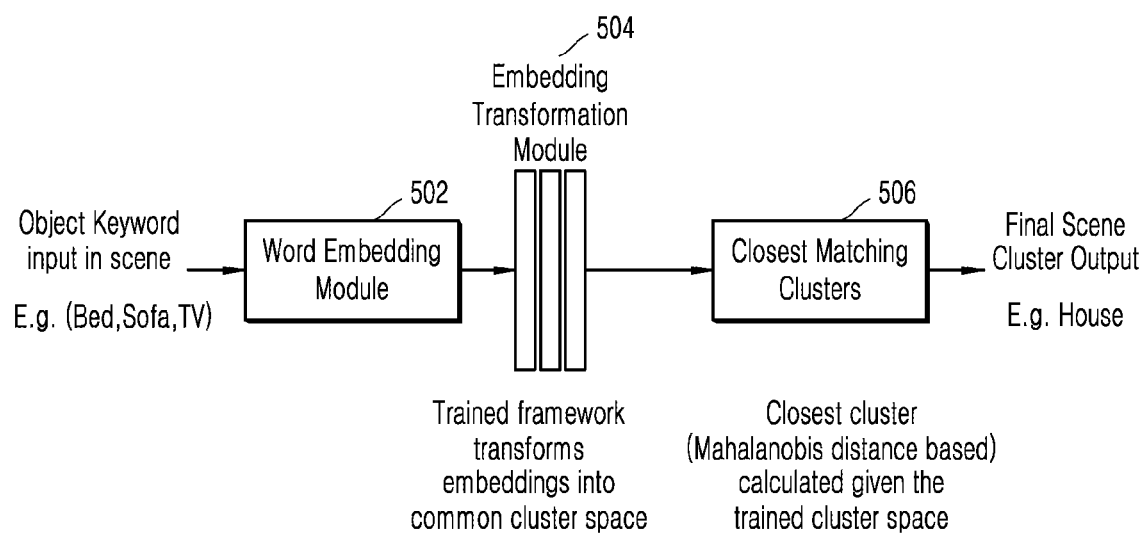
FIG. 5 is a diagram illustrating an example inference phase with respect to automatic-classification scenario of FIG. 3 according to various embodiments.

FIG. 5 is a diagram illustrating an example inference phase with respect to automatic-classification scenario of FIG. 3 according to various embodiments. In such a scenario, the inference input may include a list of keywords/objects present in the current input.

Operation 502 may refer, for example, to word embedding, wherein similar embedding module is used to convert the inference input into vector space Operation 504 may refer, for example, to embedding inference, wherein fully connected layers transform new input into the cluster vector space using trained weights.

Operation 506 may refer, for example, to closest matching clusters, wherein cluster closest to this transformed vector set is returned as the "Scene" output. In an example, "closeness" matching may be done by, for example, Mahalanobis Distance computation between centroids. Likewise, the closeness matching may be executed by other state of the art criteria such as cosine similarity etc.

Figure 6:
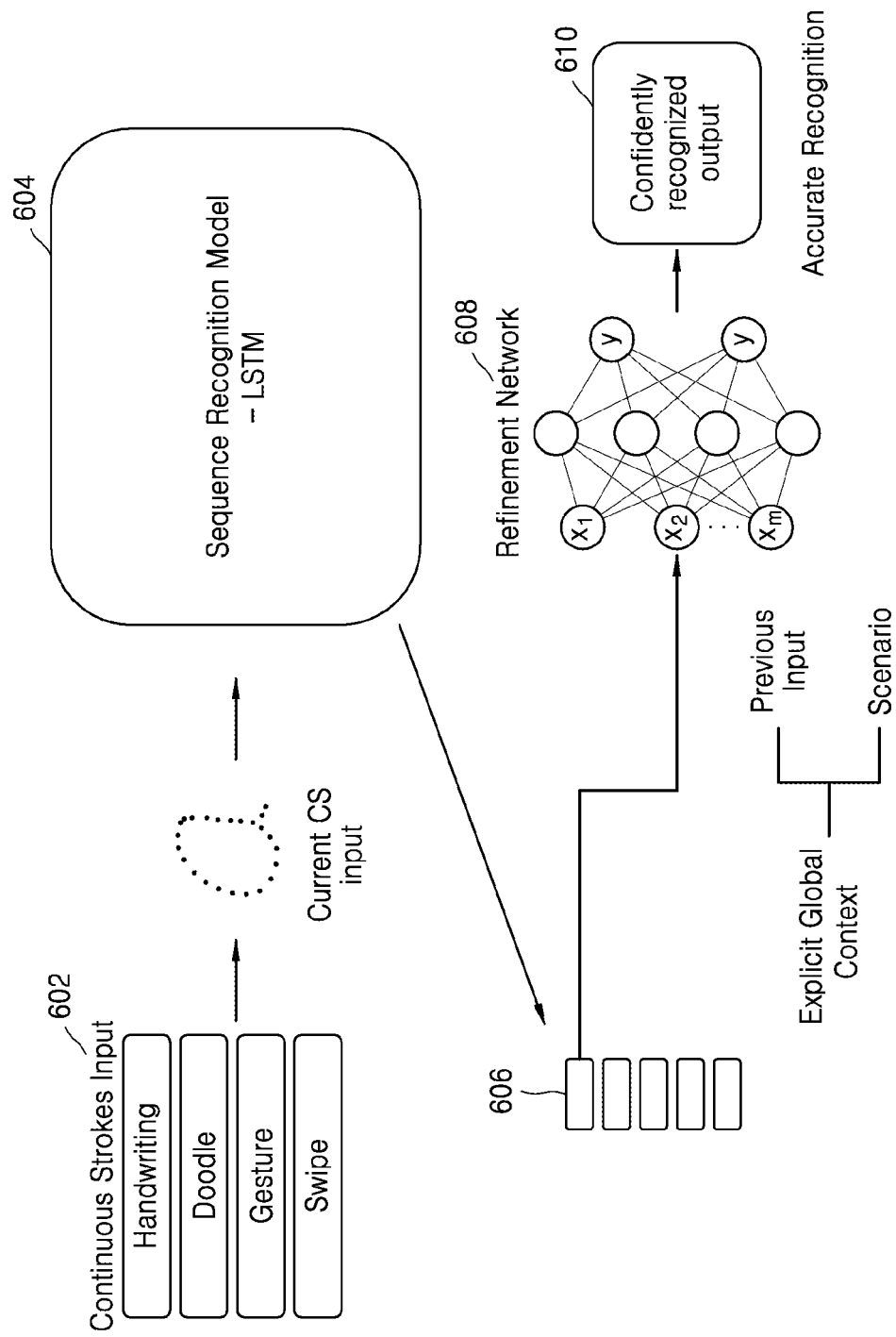
FIG. 6 is a diagram illustrating an example operation of a dynamic weighted temporal stroke biases according to various embodiments.

FIG. 6 is a diagram illustrating an example operation of a dynamic weighted temporal stroke biases that may correspond to 206 of FIG. 2 according to various embodiments. Using a neural-network, a positional significance of the first handwriting input may be analyzed in relation to the determined context of FIG. 3

Operation 602 may represent receipt of continuous stroke input, interchangeably referred as CS input, as referred in operation 302 of FIG. 3. Various types of CS inputs are all represented as sequence points (x,y,t). Similar AI models may be used to detect and recognize gestures, Handwriting, Doodling etc.

Operation 604 may refer, for example, to an operation of sequence recognition model-LSTM. LSTM (Long-Short Term Memory) cells are stacked together to recognize the CS input. They however often fail to utilize the global context and scene understanding. Accordingly, the control flow proceeds to operation 606.

At operation 606, the confused intermediate recognition may be derived based on a local-context and a plurality of results are collated. An intermediate recognition result may be generated based on the at least one first handwriting input and one or more subsequent handwriting inputs;

At operation 608, a neural-network based deep learning operation may take place. Weight of historically captured keywords and one or more possible scenarios associated with the context are learned. The neural network may learn the dynamic weight for previous keywords and possible scenario. The presence of smartly collated additional information eliminates confusion between candidate classes. The scenario-input from FIG. 3 along with the previously provided inputs may be used to refine the predictions as otherwise made based on local context. Such an explicit use of global context reduces confusion and improves recognition ability.

Operation 610 may refer, for example, to finding the confidently recognized output. The CS input is recognized from the intermediate recognition result based on the learned weight.

Figure 7:
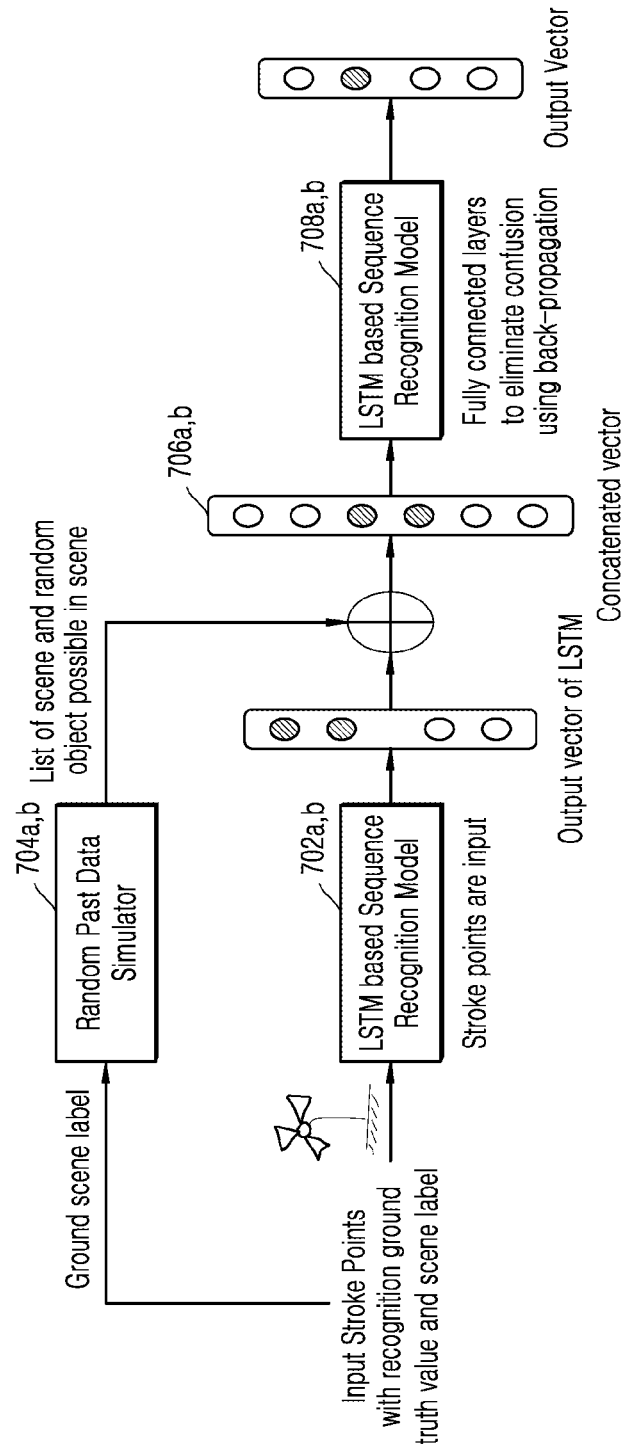
FIG. 7 is a diagram illustrating an example training-phase with respect to Dynamic Weighted Temporal Stroke biases of FIG. 6 according to various embodiments.

FIG. 7 is a diagram illustrating an example training-phase with respect to Dynamic Weighted Temporal Stroke biases of FIG. 6 according to various embodiments. The training data is defined by a format {{(x1,y1) (xn,yn)}, <GT>, <SL>} containing:

Stroke points {(x1,y1) (xn,yn)}
Ground Truth Label (<GT>)
Scene Label (<SL>)

At operation 702a, as a part of sequence recognition training, stroke points {(x1,y1) (xn,yn)} are input to the recognition module. An LSTM based network with a CTC cost function handles sequential data.

At operation 704a, as a part of random past data simulator, a random object possibly present in the scene is picked given a scene label in inference phase. A pair of known scene label and probable object may be output to concatenation layer At operation 706a, as a part of concatenation, the "confused" LSTM output is concatenated with the "simulated" past information and scene tags.

At operation 708a, as a part of refinement network training, fully connected (FC) network is trained with back-propagation to further eliminate LSTM confusion using past data.

As a part of the inference phase, inference input may be stroke points {(x1,y1) . . . ($x_n,y_n$)} input by a user sent to recognition module and existing information is sent to scene clusterer. Following are example steps that correspond with operations 702 to 708 of the training phase Operation 702b—As Sequence Recognition Inference, stroke points {(x1,y1) . . . (xn,yn)} input to trained recognition module to detect an initial list of "possibilities"

Operation 704b—As a part of the scene clustering module, past object keywords are sent to scene-clusterer to detect possible "scene"

Figure 8:
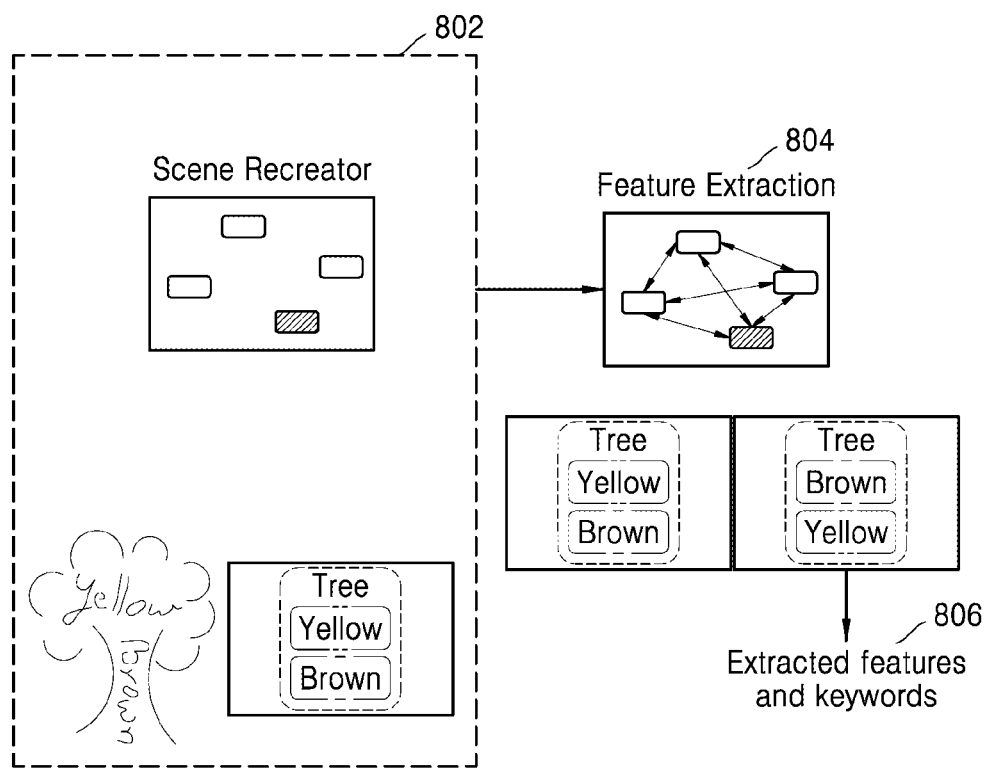
FIG. 8 is a diagram illustrating example geometric feature mapping related to step 208 of FIG. 2 according to various embodiments.

Operation 706b—As a part of concatenation, the "confused" LSTM output is concatenated with scene tags and past object information Operation 708b—As a part of refinement network inference, trained network is employed to resolve the confusion using concatenated vector and send a "confirmed" output for input object strokes FIG. 8 is a diagram illustrating example geometric feature mapping and is related to operation 208 of FIG. 2 according to various embodiments. A scene description depicting location of the at least one object is generated based on the analyzed positional significance of the first handwriting-input.

Operation 802 relates to provision of previously recognized inputs and the possible scenarios as identified in FIG. 3. Further, the current accurate recognition from FIG. 6 is also gathered.

Operation 804 relates to the system recreating the given user input in multi-dimensional canvas (at least 2-D) in a system-readable format. Recognized keywords (from multiple modalities) and their possible bounding boxes are arranged in the canvas at their expected position (given by user). As shown in FIG. 8, in example scenario, keywords tree, yellow and brown are arranged and the geometric placement, overlap is observed. Overall, the recognized keywords and corresponding bounding boxes are arranged in a diagrammatic representation at one or more positions, said recognized keywords and positions determined based on the context and the positional significance of the at least one first handwriting input and the one or more subsequent handwriting inputs.

Operation 806 depicts a feature extraction phase wherein the inputs, possible scenarios and geometry of entire input-space are converted into a dense graph. Logical relationships are extracted from the knowledge of dense graph. The overlap of inputs, and placement (top, bottom, semantic position—tiling of roof etc.) are smartly utilized as features As shown in example with respect to operation 806, overlap of keywords may indicate the following features:

TABLE 1

| Tree | Tree; |
| yellow leaves; brown trunk | brown leaves; yellow trunk |
| Tree | Tree |

Figure 9:
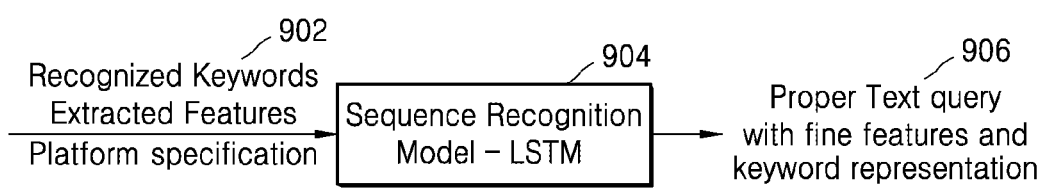
FIG. 9 is a diagram illustrating example Query Formulation (intent-classification) related to step 210 of FIG. 2 according to various embodiments.

Operation 808 relates to the extraction of list of extracted-features with proper keywords. In other words, the one or more logical relationships are extracted from a dense graph for thereby extracting a list of all extracted features with proper keywords. FIG. 9 is a diagram illustrating an example of Query Formulation (intent-classification) and illustrates an example related to operation 210 of FIG. 2 according to various embodiments. Previously recognized and current keywords along with derived features, possible scenarios and platform specification together greatly aid in smart query formulation. As a part of Natural Language Generation AI (NLP), and LSTM blocks may be used to generate text with emphasis on application environment and recognized CS.

Operation 902 relates to receipt of input as keywords and features from FIG. 8 and the correct recognition result from FIG. 6. In addition, platform specification acts as input-source. For example, different application environments such as Photo Gallery, Chat app, social networking site, Camera etc. can result in different queries.

Operation 904 relates to generation of natural language query or natural language command generation. From the input as provided in operation 902, the system extracts environment, keywords, scenarios, features etc., and combines them to curate meaningful queries. Natural Language processing models (LSTMs) are used to create a text query. The text query generated is system agnostic e.g., the current and future system can all interpret text queries as generated. extracting parameters Overall, the parameters are extracted as one or more of environment, keywords, stroke mappings, features based on the scene description and location of the at least one object within the scene description, said environment and scene description having been optionally linked with a device controlled by the user;

Operation 906 relates to a generation of proper text query with fine features and keyword representation for better results. The parameters are combined to generate a search query, said search query corresponding to natural language query or machine-language query.

The generation of the user command may include generating the query based on one or more of: the extracted features, a set of keywords comprising previously stored keywords or current recognized keywords associated with the context and the positional significance of the handwritten input, the environment and the scene description linked with a device controlled by the user; and optionally one or more on-device platforms or remote-server platforms Example queries as generated may include:
  Gallery: "Search for an image of tree at center with yellow leaves and brown trunk".
  Augmented Reality AR: "Place a model of Tree with yellow leaves and brown trunk at the center of the frame".
  Chat app: "Send a sticker/gif of a tree with yellow leaves and brown trunk on chat"

Figure 10:
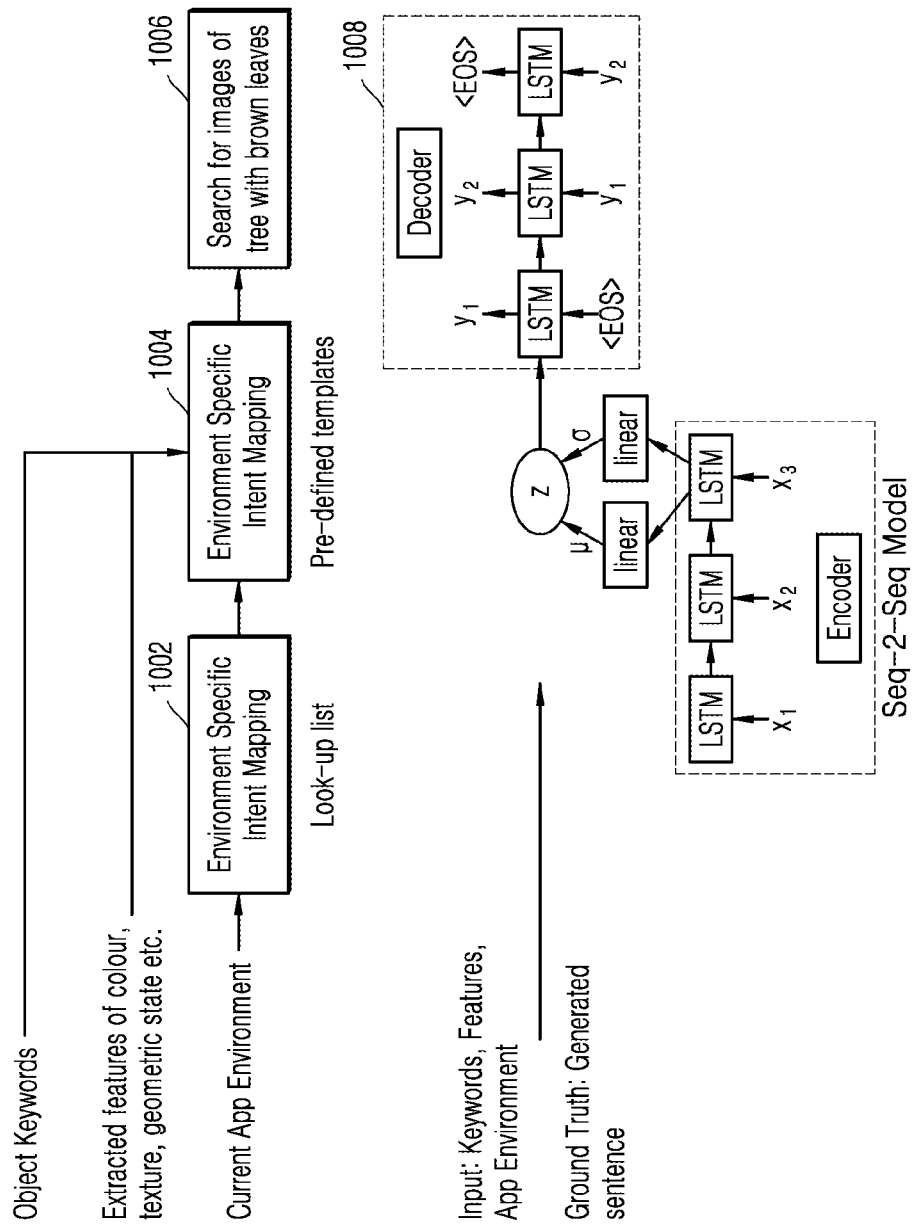
FIG. 10 is a diagram illustrating an example training-phase with respect to natural language query formulation of FIG. 9 according to various embodiments.

FIG. 10 is a diagram illustrating an example training-phase with respect to natural language query formulation as illustrated in FIG. 9 according to various embodiments.

Operations 1002 to 1006 relate to training data generation.

Operation 1002 relates to defining example training data by inputs such as (i) Possible Object Keywords (ii) Relevant Features (iii) App environment.

Operation 1004 relates to intent mapping wherein a look-up table defines correct "intent" given to an open application environment. Example include search intent for gallery, edit intent for AR, send intent for Messaging etc.

Operation 1006 relates to sentence generator wherein the template based module generates possible query sentences.

Operation 1008 relates to retraining of pre-trained Neural Language Generator (NLG) model retraining wherein generated sentences from step 1006 are used to retrain and refine a pre-trained LSTM and sequence-to-sequence models based NLG system.

Figure 11:
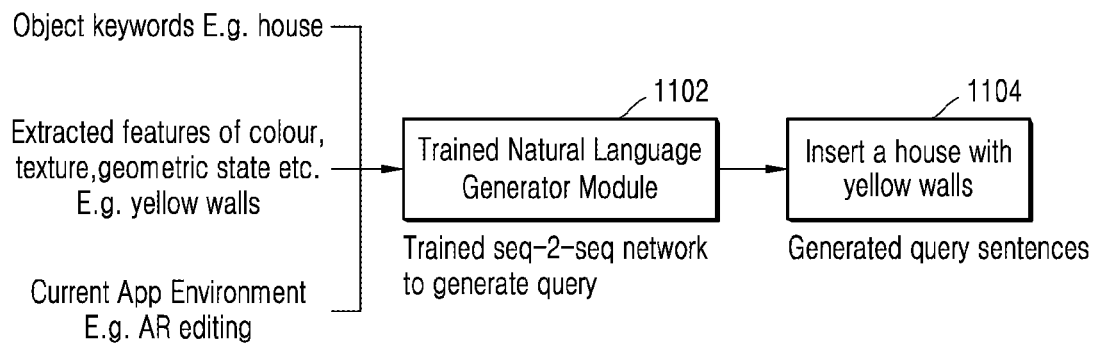
FIG. 11 is a diagram illustrating an example inference-phase with respect to natural language query formulation of FIG. 9 according to various embodiments.

FIG. 11 is a diagram illustrating an example inference-phase with respect to natural language query formulation as illustrated in FIG. 9 according to various embodiments.

At operation 1102, the inference input may be defined by recognized object keywords, extracted features of color, texture etc. and a current application environment.

At operation 1104, as a part of operation of trained NLG Module as depicted in operation 1008, a concatenated input list is sent to the NLG module to generate application-specific query given user input and understood inherent intent.

As may be understood during the inference phase, the user does not need to provide any further input to specify his requirements as the system itself infers the user-defined needs and provides the required task completion inputs to other modules.

Figure 12:
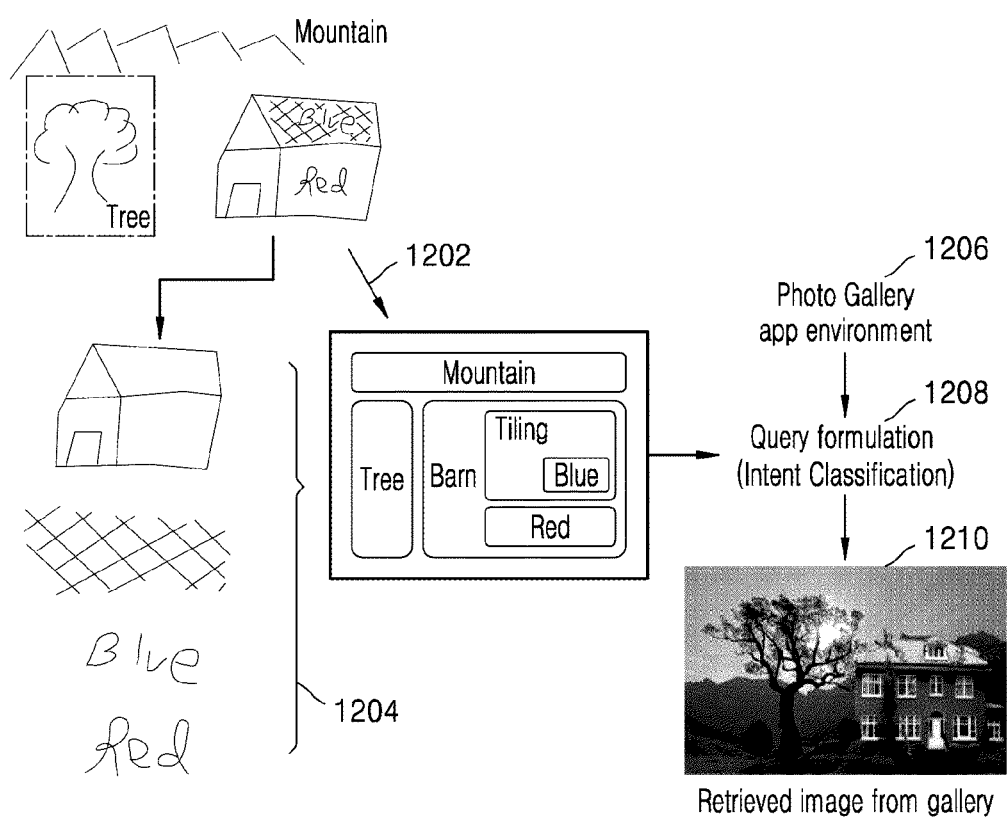
FIG. 12 is a diagram illustrating example control flow with example operation according to various embodiments.

FIG. 12 is a diagram illustrating an example control flow according to various embodiments. An example CS input as a part of operation 202 may be obtained as depicted in FIG. 12.

Operation 1202 relates to clustering stage of FIG. 3 and corresponding to operation 204 marks the scenario as an outdoor landscape (e.g., global context) based on the obtained CS input.

Operation 1204 relates to determination of local-context and accurate recognition as a part of FIG. 6 and operation 206. As a part of operation of the present refinement stage or local context determination stage, landscape is identified as having more chances of barn over house and having more chances of tiling. As a part of accurate recognition methods, keywords blue and red are also identified. Accordingly, the present system would understand this input as "house with blue roof and red wall", taking into account the geographical position and the relation with the individual elements. The present operations essentially take into account the integrated scene, rather than individual elements. In contrast, the state of the art systems tend to interpret the CS input as "house, blue and red" without an understanding of the complete input at once, thereby leading to loss of inherent information provided by the CS input by the state of the art systems. The present operation enables refinement of the understanding of recognized elements by understanding a complete scene-context Operation 1206 relates to operation of step 208 and FIG. 8. As a part of operation, the scene recreator uses the bounding boxes and keywords to create a canvas or a diagrammatic representation of user input based on outcome of step 1204 and thereafter key features are extracted.

In an example, example features as extracted may include:
1. Tiling on top indicate roof tiling;
2. Tiling overlap with blue indicate blue-tiled roof;
3. Overlap of red indicate Red walls;
4. Mountain on Top of barn; and
5. Tree on the left of Barn
    operation 1208 relates to operation 210 and FIG. 9. As a part of the present operation, Query formulation through NLG is performed, wherein such query implicitly denotes intent classification. The same may be also supported from an example platform specification such as photo-gallery.

An example NLG query as generated may be "Search in images the Landscape with mountains on top, tree on left and a barn with blue tiled roofs, red walls on the right."

Operation 1210 depicts the image as output from the galley and meeting the criteria as depicted in operation 1208.

Figure 13:
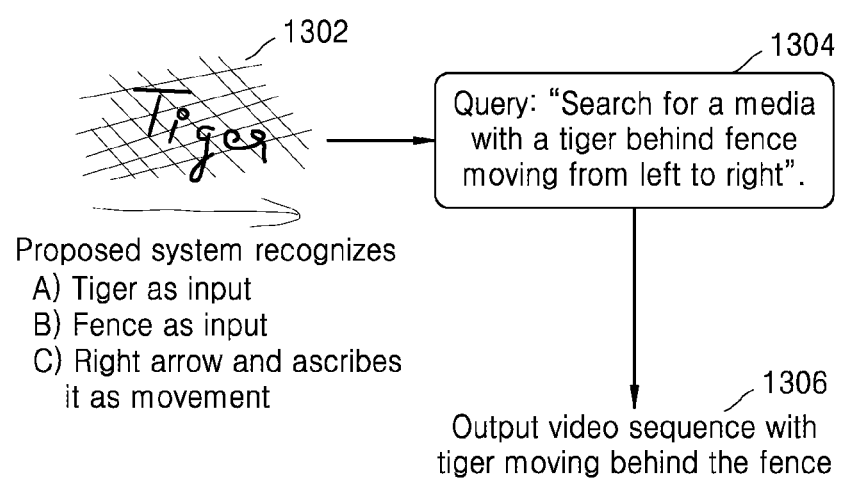
FIG. 13 is a diagram illustrating an example outcome according to various embodiments.

FIG. 13 is a diagram illustrating an example outcome according to various embodiments. In an example, a user search for memorable experiences in places like zoo, parks, beaches etc. The present disclosure can allow search within videos, gifs, and other motion pictures.

Operation 1302 refers receipt of user input as CS input. Based on the obtained CS input, the system recognizes right-arrow, the tiger, and fence as input and accordingly able to disambiguate the input.

Operation 1304 formulates the natural language query as "search for a media with a tiger behind fence moving from left to right?".

Operation 1306 retrieves media from the photo-gallery based on operation 1304.

Figure 14B:
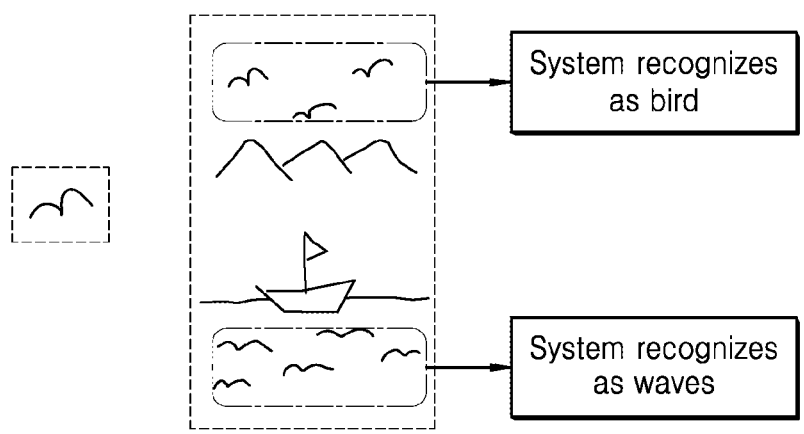

FIGS. 14A and 14B are diagrams illustrating an example outcome according to various embodiments. The present example illustrates that to interpret user input, past context may be needed to understand user intentions.

In respect of the given CS input in FIG. 14A, a state of the art sketch recognition module is confused about input as to whether it is fan or a flower, thereby requiring additional user input (as provided in green dotted line) to understand the sketch or the CS input. In contrast, the present subject matter considers the complete 'scene' or context (whether indoor or outdoor) of the existing input and thereby enhances recognition to understand user needs. Depending on the scene or context, the present subject matter identifies the provided CS input as Fan or Flower.

Likewise, in respect of the given CS input in FIG. 14B, the provided CS input on its own could be a scribble or even the letter 'n'. However, taking into account the geographical location of the strokes in the existing input, understanding of the strokes may be derived as either a bird or hill.

Figure 15A:
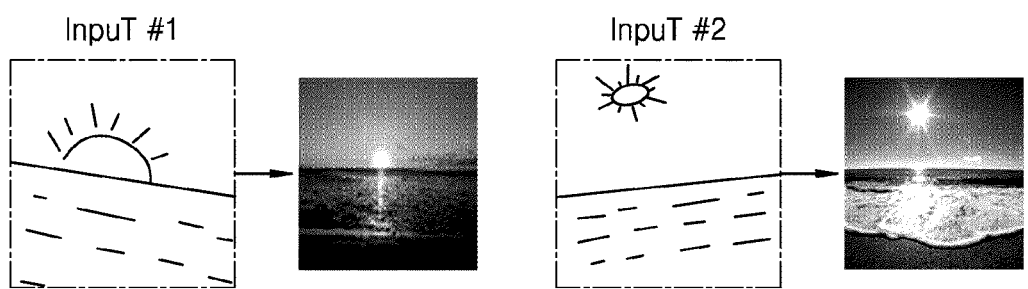
FIGS. 15A and 15B are diagrams illustrating an example outcome according to various embodiments.
Figure 15B:
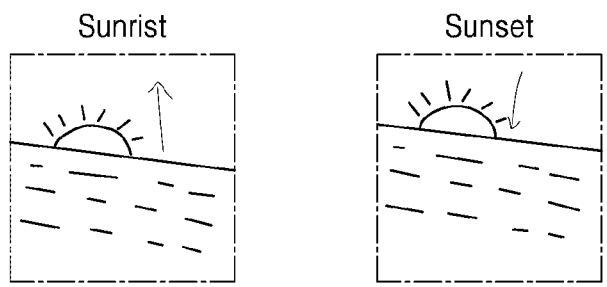

FIGS. 15A and 15B are diagrams illustrating an example outcome according to various embodiments. The present example outcome allows users to easily and innovatively search and retrieve multimedia (photos, videos, gifs etc.).

As depicted in FIG. 15A, the user input is similar in both cases. Geometric placement reveals additional input descriptors that refine the retrieval. As depicted in FIG. 15B, the CS input may be used to highlight motion and improve scene description.

Figure 16A:
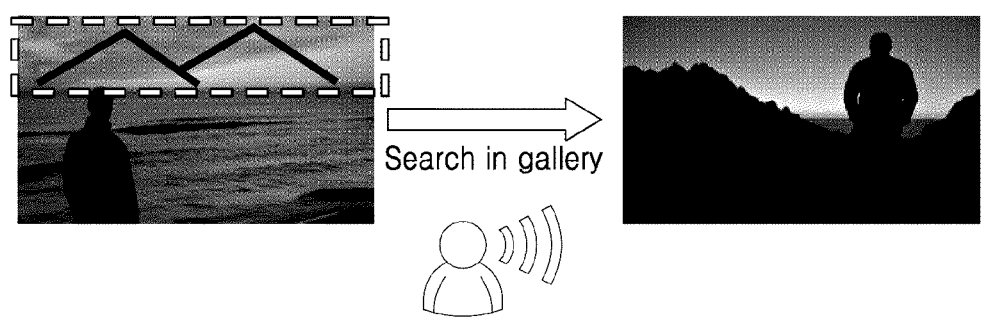
Figure 16B:
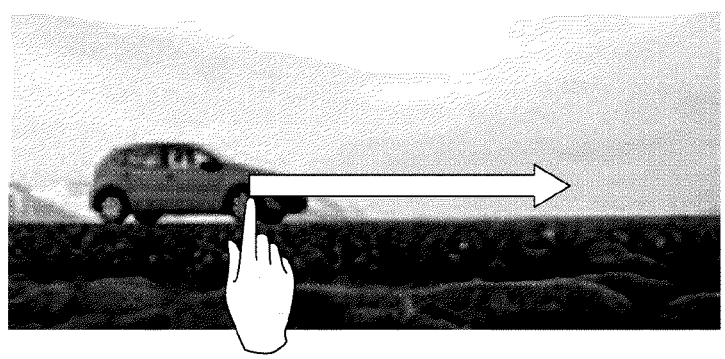

FIGS. 16A, 16B and 16C are diagrams illustrating example outcomes according to various embodiments.

FIG. 16A illustrates that CS on top of images, videos etc. can be used to refine search results. Extracting and combining information from videos, images with CS greatly reduces the amount of user input required for search. The present figures supports multi-modal scene context understanding, and is not limited to only previously input strokes. For example, if a user provides an input on an existing image. The recognized strokes of "mountain" are associated with the existing elements of person and ocean/water body, keeping in mind the relative positions of each of the elements. The query thus formed is "Person standing in front of ocean with a mountain on top". Further, another set of user inputs may be provided in the form of voice based input and/or search button based actuation to supplement the CS input and thereby attain the search results.

FIG. 16B illustrates AR, IoT and gesture-based for achieving object control. In AR glasses, connected cars (IoT) scenario, gestures are key to user input. CS input like an air hand gesture when associated with object recognition and geometric object placement enable advanced controls for user. The present subject matter recognizes the relation between object (red car) and air gestures and instructs the system to automatically move the car to a new location. This enables advanced control to user. Likewise, another set of user inputs may be provided in the form of voice based input and/or search button based actuation to supplement the provided CS input and thereby attain the search results.

FIG. 16C illustrates a co-referencing based embodiment in accordance with an embodiment. Likewise, another set of user inputs may be provided in the form of voice based input and/or search button based actuation to supplement the CS input and thereby attain the search results.

Expressing proper query in single modality is often inconvenient for user: For example, for a query like "How many calories are there in the food", it is also difficult for the system to understand. In multi-modal scenarios, identifying the subject and key components from multiple inputs is a challenging problem.

Figure 17:
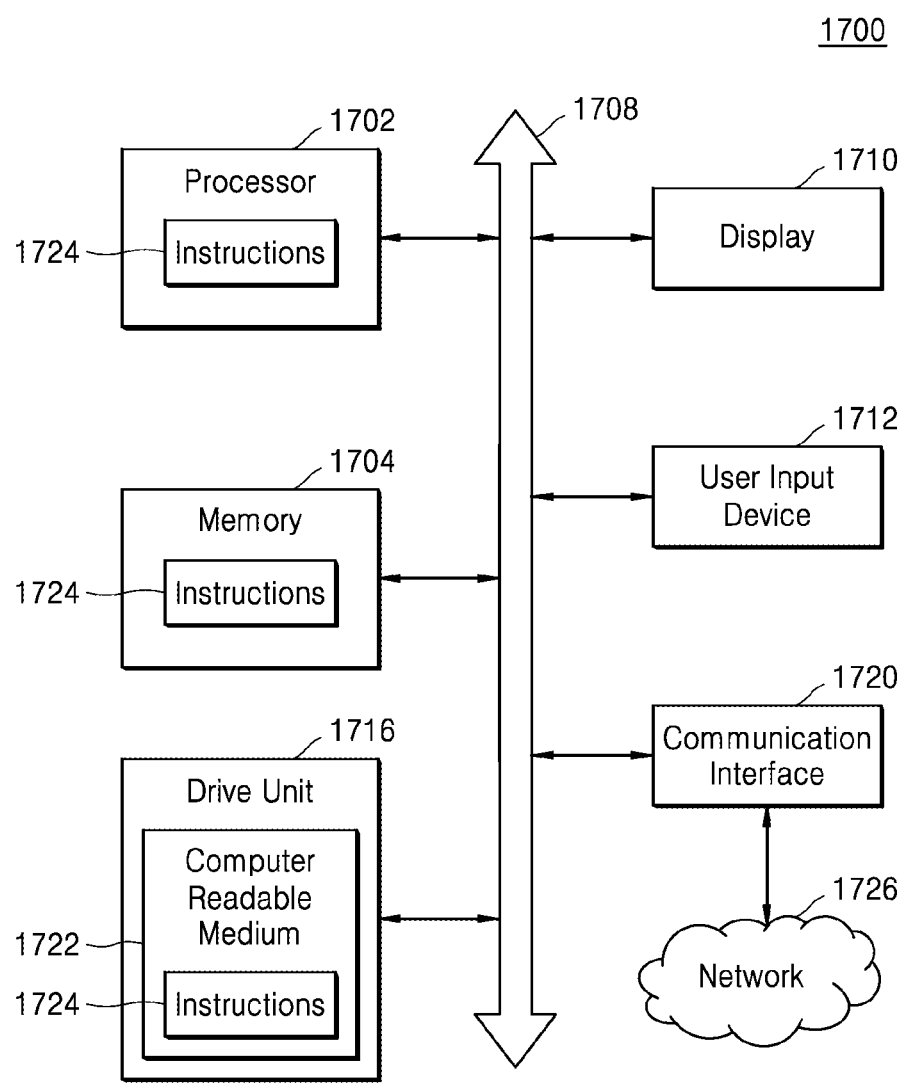
FIG. 17 is a block diagram illustrating an example configuration of an electronic device according to various embodiments.

In accordance with an embodiment, CS like gesture or point are very useful in such scenarios: While the user utters speech: "How many calories?", a corresponding CS is drawn around the subject or food item under consideration in the image FIG. 17 is a block diagram illustrating an example configuration of the system, in the form of a computer-system 1700. The computer system 1700 can include a set of instructions that can be executed to cause the computer system 1700 to perform any one or more of the methods disclosed. The computer system 1700 may operate as a standalone-device or may be connected, e.g., using a network, to other computer systems or peripheral devices.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance or any other machine capable of executing a set of instructions (sequential or otherwise) that specify actions to be taken by that machine. Further, while a single computer system 1700 is illustrated, the term "system" shall also be taken to include any collection of systems or sub-systems that individually or jointly execute a set, or multiple sets, of instructions to perform one or more computer functions.

The computer system 1700 may include a processor (e.g., including processing circuitry) 1702 e.g., a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application specific integrated circuits, field programmable gate arrays, servers, networks, digital circuits, analog circuits, combinations thereof, or other now known or later developed devices for analyzing and processing data. The processor 1702 may implement a software program, such as code generated manually (e.g., programmed).

The computer system 1700 may include a memory 1704, such as a memory 1704 that can communicate via a bus 1708. The memory 1704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1704 includes a cache or random access memory for the processor 1702. In alternative examples, the memory 1704 is separate from the processor 1702, such as a cache memory of a processor, the system memory, or other memory. The memory 1704 may be an external storage device or database for storing data. The memory 1704 is operable to store instructions executable by the processor 1702. The functions, acts or tasks illustrated in the figures or described may be performed by the programmed processor 1702 for executing the instructions stored in the memory 1704. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1700 may or may not further include a display 1710, such as a liquid crystal display (LCD), an organic light emitting diode (OLED), a flat panel display, a solid state display, a cathode ray tube (CRT), a projector, a printer or other now known or later developed display device for outputting determined information. The display 1710 may act as an interface for the user to see the functioning of the processor 1702, or as an interface with the software stored in the memory 1704 or in the drive unit 1716.

Additionally, the computer system 1700 may include a user input device (e.g., including input circuitry) 1712 configured to allow a user to interact with any of the components of system 1700. The computer system 1700 may also include a disk or optical drive unit 1716. The drive unit 1716 may include a computer-readable medium 1722 in which one or more sets of instructions 1724, e.g. software, can be embedded. Further, the instructions 1724 may embody one or more of the methods or logic as described. In a particular example, the instructions 1724 may reside completely, or at least partially, within the memory 1704 or within the processor 1702 during execution by the computer system 1700.

The disclosure contemplates a computer-readable medium that includes instructions 1724 or obtains and executes instructions 1724 responsive to a propagated signal so that a device connected to a network 1726 can communicate voice, video, audio, images or any other data over the network 1726. Further, the instructions 1724 may be transmitted or received over the network 1726 via a communication port or interface (e.g., including communication circuitry) 1720 or using a bus 1708. The communication port or interface 1720 may be a part of the processor 1702 or may be a separate component. The communication port 1720 may be created in software or may be a physical connection in hardware. The communication port 1720 may be configured to connect with a network 1726, external media, the display 1710, or any other components in system 1700, or combinations thereof. The connection with the network 1726 may be a physical connection, such as a wired Ethernet connection or may be established wirelessly as discussed later. Likewise, the additional connections with other components of the system 1700 may be physical connections or may be established wirelessly. The network 1726 may alternatively be directly connected to the bus 1708.

Further, at least one of the plurality of modules of mesh network may be implemented through AI based on an ML/NLP logic A function associated with AI may be performed through the non-volatile memory, the volatile memory, and the processor of the first hardware module e.g., specialized hardware for ML/NLP based mechanisms. The processor may include one or a plurality of processors. One or a plurality of processors may include a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Being provided through learning may refer, for example to, by applying a learning logic/technique to a plurality of learning data, a predefined operating rule or AI model of the desired characteristic being made. obtained by training" may refer, for example, to a predefined operation rule or artificial intelligence model configured to perform a desired feature (or purpose) being obtained by training a basic artificial intelligence model with multiple pieces of training data by a training technique. The learning may be performed in a device itself in which AI according to an embodiment is performed, and/or may be implemented through a separate server/system.

The AI model may include a plurality of neural network layers. Each layer may have a plurality of weight values, and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), deep Q-networks, or the like.

The ML/NLP logic may refer, for example, to a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

While specific language has been used to describe the disclosure, any limitations arising on account of the same are not intended. As would be apparent to a person in the art, various working modifications may be made to the method in order to implement the disclosure as taught herein.

The drawings and the forgoing description provide examples of embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not limited to the manner described herein.

Moreover, the actions of any flow diagram or flowchart need not be implemented in the order shown; nor do all of the acts necessarily need to be performed. Those acts that are not dependent on other acts may be performed in parallel with the other acts. The scope of embodiments is not limited by these specific examples. Numerous variations, whether explicitly given in the disclosure or not, such as differences in structure, dimension, and use of material, are possible. The scope of the various example embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A method for recognizing handwritten input by an electronic device, the method comprising:
   obtaining at least one first handwriting input representative of at least one first object;
   determining a context of the at least one first handwriting input by referring to a log of actions;
   analyzing, using a neural network, a positional significance of the at least one first handwriting input in relation to the determined context;
   generating a scene description depicting location of the at least one first object based on the analyzed positional significance of the at least one first handwriting input;
   generating a command in response to the generated scene description to enable performance of an action, the command referring to the location of the at least one first object within the scene description; and
   obtaining a second handwriting input comprising a continuous stroke input and representative of a second object different from the at least one first object associated with the at least one first handwriting input.

2. The method as claimed in claim 1, wherein the at least one first handwriting input includes a hand-scribbled sign comprising one or more strokes, the at least one first handwriting input comprising one or more successive inputs.

3. The method as claimed in claim 1, wherein the log of actions comprises a history of actions executed prior to the at least one first handwriting input.

4. The method as claimed in claim 1, wherein the analyzing of the positional significance further comprises analyzing a positional relationship of a second handwriting input with reference to the at least one first handwriting input in relation to the determined context.

5. The method as claimed in claim 1, wherein generating of the command comprises:
   extracting parameters including one or more of environment, keywords, stroke mappings, features based on the scene description and location of the at least one first object within the scene description, the environment and scene description being linked with a user-controlled device; and
   combining the parameters to generate a search query corresponding to a natural language query or a machine-language query.

6. The method as claimed in claim 1, further comprising:
   obtaining selection of at least one background,
   wherein the context is associated with the background.

7. The method as claimed in claim 6, wherein the determining of the context comprises:
   accessing one or more previously recognized objects related to the background, the previously recognized objects corresponding to one or more modalities other than handwriting to render information about global context;
   recognizing one or more keywords based on the one or more accessed objects; and
   combining the recognized keywords to determine one or more possible scenarios governing the context.

8. The method as claimed in claim 7, wherein the analyzing of the positional significance of the at least one first handwriting input comprises recognizing a continuous stroke (CS) input based on:
generating an intermediate recognition result based on the at least one first handwriting input and one or more-subsequent handwriting inputs;
learning a weight of historically captured keywords and one or more possible scenarios associated with the context; and
recognizing the CS input from the intermediate recognition result based on the learned weight.

9. The method as claimed in claim 6, wherein the generating of the scene description comprises forming a multi-dimensional representation based on:
arranging recognized keywords and corresponding bounding boxes in a diagrammatic representation at one or more positions, the recognized keywords and positions being determined based on the context and the positional significance of the at least one first handwriting input and one or more subsequent handwriting inputs;
converting the diagrammatic representation into a dense graph; and
extracting one or more logical relationships from the dense graph and extracting a list of all extracted features with proper keywords.

10. An electronic device for recognizing handwritten input, the electronic device comprising:
memory storing instructions; and
at least one processor,
wherein the instructions, when executed by the at least one processor individually and/or collectively cause the electronic device to perform operations comprising:
obtaining at least one first handwriting input representative of at least one first object;
determining a context of the at least one first handwriting input by referring to a log of actions;
analyzing, using a neural network, a positional significance of the at least one first handwriting input in relation to the determined context;
generating a scene description depicting location of the at least one first object based on the analyzed positional significance of the at least one first handwriting input;
generating a command in response to the generated scene description to enable performance of an action, the command referring to the location of the at least one first object within the scene description; and
obtaining a second handwriting input represented by continuous stroke input and representative of a second object different from the at least one first object associated with the at least one first handwriting input.

11. The electronic device as claimed in claim 10, wherein the at least one first handwriting input includes a hand-scribbled sign comprising one or more strokes, the at least one first handwriting input comprising one or more successive inputs.

12. The electronic device as claimed in claim 10, wherein the log of actions comprises a history of actions executed prior to the at least one first handwriting input.

13. The electronic device as claimed in claim 10, wherein the instructions, when executed by the least one processor individually and/or collectively cause the electronic device to perform operations comprising:
analyzing a positional relationship of a second handwriting input with reference to the at least one first handwriting input in relation to the determined context.

14. The electronic device as claimed in claim 10, wherein the instructions, when executed by the at least one processor individually and/or collectively cause the electronic device to perform operations comprising:
extracting parameters as one or more of environment, keywords, stroke mappings, features based on the scene description and location of the at least one first object within the scene description, the environment and scene description being linked with a user-controlled device; and
combine the parameters to generate a search query corresponding to natural language query or machine-language query.

15. The electronic device as claimed in claim 10, wherein the instructions, when executed by the at least one processor individually and/or collectively cause the electronic device to perform operations comprising:
obtaining, selection of at least one background,
wherein the context is associated with the background.

16. The electronic device as claimed in claim 15, wherein the determining of the context comprises:
accessing one or more previously recognized objects related to the background, the previously recognized objects corresponding to one or more modalities other than handwriting to render information about global context;
recognizing one or more keywords based on the one or more accessed objects; and
combining the recognized keywords to determine one or more possible scenarios governing the context.

17. The electronic device as claimed in claim 16, wherein the analyzing of the positional significance of the at least one first handwriting input comprises recognizing a continuous stroke (CS) input based on:
generating an intermediate recognition result based on the at least one first handwriting input and one or more-subsequent handwriting inputs;
learning a weight of historically captured keywords and one or more possible scenarios associated with the context; and
recognizing the CS input from the intermediate recognition result based on the learned weight.

18. A non-transitory computer-readable recording medium having recorded thereon a program which, when executed by at least one processor of an electronic device, causes the electronic device to perform operations comprising:
obtaining at least one first handwriting input representative of at least one first object;
determining a context of the at least one first handwriting input by referring to a log of actions;
analyzing, using a neural network, a positional significance of the at least one first handwriting input in relation to the determined context;
generating a scene description depicting location of the at least one first object based on the analyzed positional significance of the at least one first handwriting input;
generating a command in response to the generated scene description to enable performance of an action, the command referring to the location of the at least one first object within the scene description; and obtaining a second handwriting input comprising a continuous stroke input and representative of a second object different from the at least one first object associated with the at least one first handwriting input.

* * * * *